(12) United States Patent
Knox et al.

(10) Patent No.: US 6,950,087 B2
(45) Date of Patent: Sep. 27, 2005

(54) KEYBOARD ILLUMINATION FOR COMPUTING DEVICES HAVING BACKLIT DISPLAYS

(75) Inventors: Andrew Ramsey Knox, Ayrshire (GB); Giuseppe Longobardi, Castellammare di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 09/949,325

(22) Filed: Sep. 7, 2001

(65) Prior Publication Data

US 2002/0050975 A1 May 2, 2002

(30) Foreign Application Priority Data

Sep. 9, 2000 (GB) .............................................. 0022128

(51) Int. Cl.[7] .............................. G09G 3/36; G09G 5/00
(52) U.S. Cl. ........................................ 345/102; 168/170
(58) Field of Search ................................ 345/168–170, 345/102, 901

(56) References Cited

U.S. PATENT DOCUMENTS

| 4,408,123 A | * | 10/1983 | Sichling et al. ............. 250/226 |
| 4,475,788 A | * | 10/1984 | Tomassini et al. ............ 385/33 |
| 4,506,947 A | * | 3/1985 | Tatekura et al. ............... 385/97 |
| 5,406,268 A | | 4/1995 | Fullmer ................... 340/815.42 |
| 6,217,183 B1 | * | 4/2001 | Shipman ....................... 362/30 |

FOREIGN PATENT DOCUMENTS

JP 4-94467 A * 8/1992 ............ B41J/29/18

* cited by examiner

*Primary Examiner*—Jimmy H. Nguyen
(74) *Attorney, Agent, or Firm*—Van Leeuwen & Van Leeuwen; Joseph T. Van Leeuwen; Jeanine Ray

(57) ABSTRACT

Apparatus is disclosed for illumination of a keyboard in a computing device having a display contained in a portion of the computing device which is hingeably attached to a keyboard portion, the display having a backlight. The system comprises one or more translucent elements associated with the keyboard and one or more light-conducting fibers for conducting light from the backlight of the backlit display to the one or more translucent elements associated with the keyboard. The level of illumination is varied by means of the one or more light conducting fibers transmitting light through two portions of transparent material, the two portions of transparent material have an area of contact between them which may be varied. A color adjustment mechanism is also provided.

1 Claim, 3 Drawing Sheets

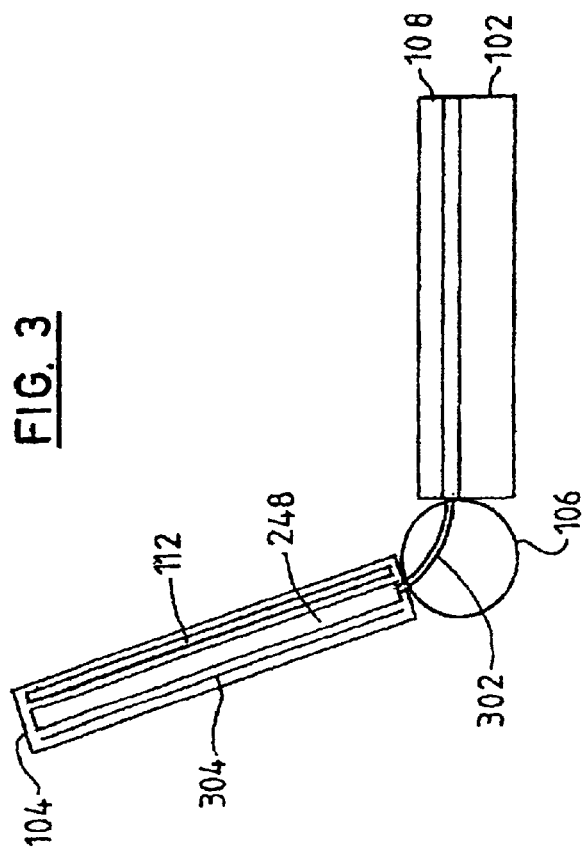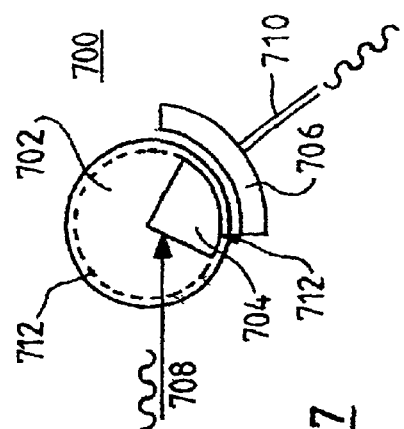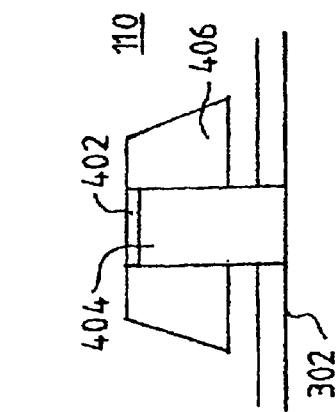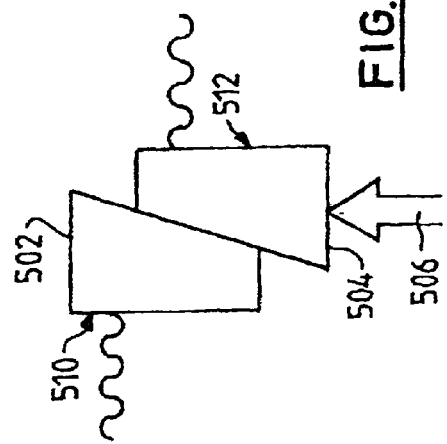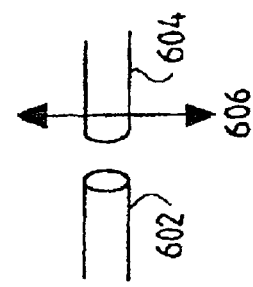

KEYBOARD ILLUMINATION FOR COMPUTING DEVICES HAVING BACKLIT DISPLAYS

FIELD OF THE INVENTION

The present invention relates to computing devices having an integral light source for a display panel and to the use of light from that integral light source for illumination of the keyboard of the computing device. More particularly, the present invention relates to the provision of a light path between the light source and the keyboard and to an intensity control and a color control for such illumination.

BACKGROUND OF THE INVENTION

A conventional portable computer can be used in many places with its in-built power source without the need for attachment to an external power source. In some of the places where a portable computer can be used, there is a low ambient light level. Examples of such environments having low ambient light levels include conference rooms during presentations, on aircraft or in cars. In areas where there is a low ambient light level, the display may be clearly seen as the display on a portable computer is typically backlit. However, the keyboard and the individual keys making up the keyboard may not be able to be seen in such conditions.

There have been previous attempts to provide lit keyboards including the provision of a light to illuminate the keyboard and the use of fluorescent materials applied to the keys. The provision of a separate light suffers from the disadvantage that additional power is needed for the light and so the usage time of the portable computer between recharges from the external power source is reduced. The provision of fluorescent materials on the keys requires that the materials are "charged" by being illuminated for a period of time prior to use. Since a portable computer is typically closed when not in use, the recharging cannot be readily achieved by normal ambient light.

PCT Patent Application WO97/04437 discloses a portable computer having a keyboard which is lit for use in low ambient light locations. Two embodiments are disclosed, one in which light from the backlight of the display panel is routed via a light pipe coupler and a backlight panel into a hollow portion of the key and one in which a portion of the light from the display panel backlight is reflected onto the top of the key making up the keyboard. The light from the backlight is coupled through a light pipe coupler, which may restrict the angle of use of the display panel with respect to the keyboard. A gate is provided to restrict or prevent light from entering the backlight panel. The light from the backlight is always white and so the key illumination will also always be white.

So it would be desirable to provide an improved mechanism for directing light from a display backlight to keys in a portable computer. It would also be desirable to provide an improved mechanism for controlling the intensity of lighting and the color of lighting for the keys in a portable computer.

SUMMARY OF THE INVENTION

Accordingly, the present invention provides apparatus for illumination of a keyboard in a computing device having a display contained in a portion of the computing device which is hingeably attached to a keyboard portion, the display having a backlight, the system comprising: one or more translucent elements associated with the keyboard; and one or more light-conducting fibers for conducting light from the backlight of the backlit display to the one or more translucent elements associated with the keyboard.

In an embodiment the level of illumination is varied by means of the one or more light conducting fibers transmitting light through two portions of transparent material, the two portions of transparent material have an area of contact between them which may be varied.

In another embodiment the level of illumination is varied by means of the one or more light conducting fibers have a coupling whereby the alignment of the fibers may be adjusted, thus altering the amount of light which is transmitted across the coupling.

In yet another embodiment the system further comprises a color adjustment mechanism having a prism for receiving light from the one or more light-conducting fibers and for splitting the received light according to the wavelength of the received light and a coupler for collecting all or a portion of the light split by the prism and for transmitting all the collected light to one or more light-conducting fibers.

Preferably, the prism is adapted to rotate in a cavity.

Further preferably, the internal surface of the cavity has at least a portion coated with a light reflecting material.

BRIEF DESCRIPTION OF THE DRAWINGS

Embodiments of the invention will now be described, by way of example, with reference to the accompanying drawings, in which:

FIG. 3 is a side cross-section of apparatus for lighting the keyboard of the personal computer of FIGS. 1 and 2 according to the present invention;

FIG. 4 shows a cross-section view of a key suitable for use in the present invention and forming part of the keyboard of the personal computer of FIGS. 1 and 2;

FIG. 5 shows a first embodiment of an adjustment mechanism to adjust the amount of light which reaches the keyboard of the personal computer of FIGS. 1 and 2;

FIG. 6 shows a second embodiment of an adjustment mechanism to adjust the amount of light which reaches the keyboard of the personal computer of FIGS. 1 and 2; and FIG. 7 shows a mechanism for controlling the color of light which is used to illuminate the keyboard of the personal computer of FIGS. 1 and 2.

DETAILED DESCRIPTION OF THE PREFERRED EMBODIMENTS

Figure 1:
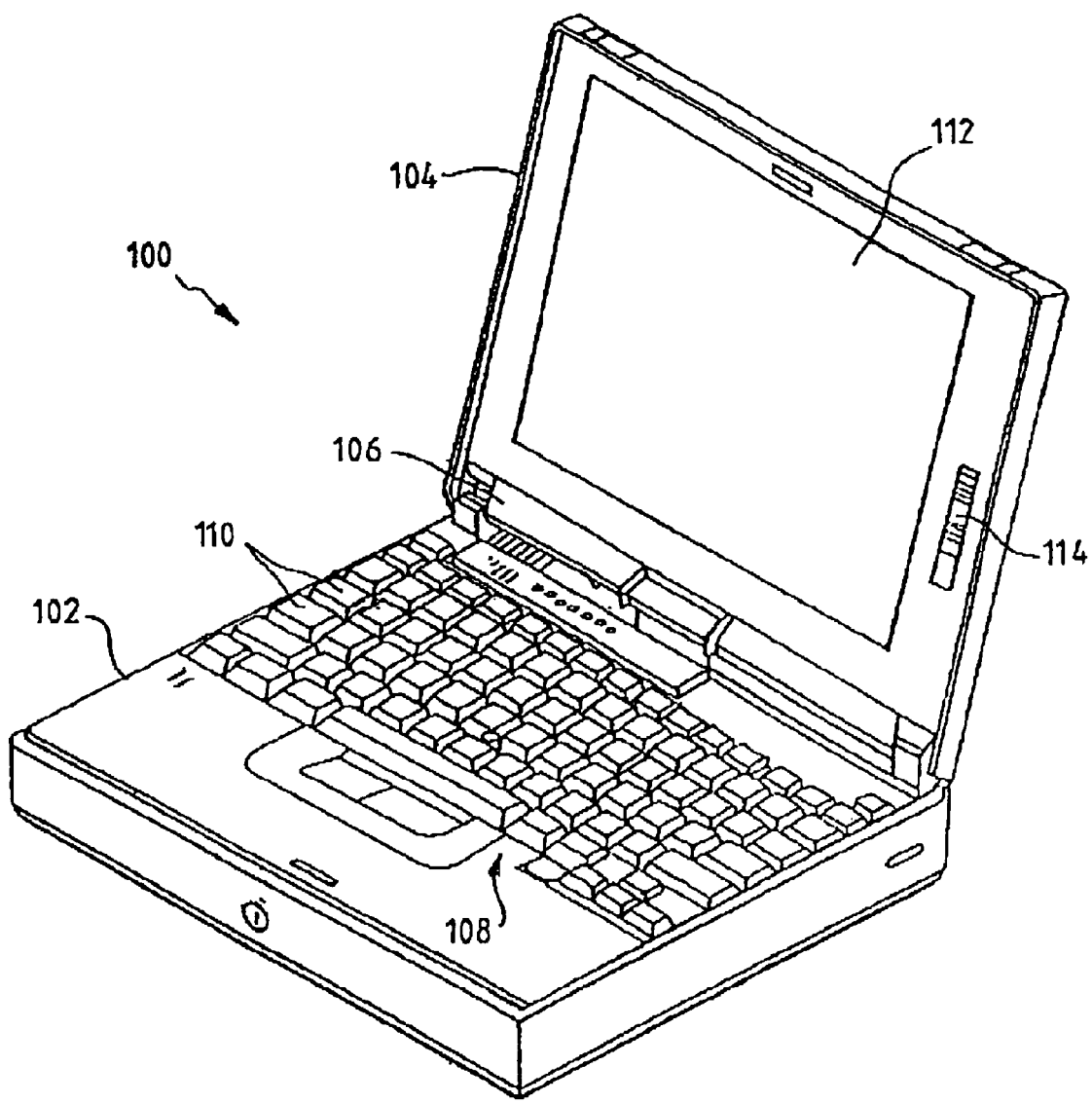
FIG. 1 is a perspective view of a portable computer according to the present invention.

FIG. 1 shows a portable electronic device such as a laptop or notebook computer 100 having a base 102 and a cover 104. The base 102 and cover 104 are rotatably connected by a hinge 106.

The computer has a keyboard 108 having a number of keys 110, each key generally having one or more characters applied to it. The computer also has a display 112 which is typically a backlit liquid crystal display. A control 114 is typically provided to adjust the contrast of the display. Keys 110 on the keyboard are pressed in order to generate and manipulate text and graphic images on the display 112.

Figure 2:
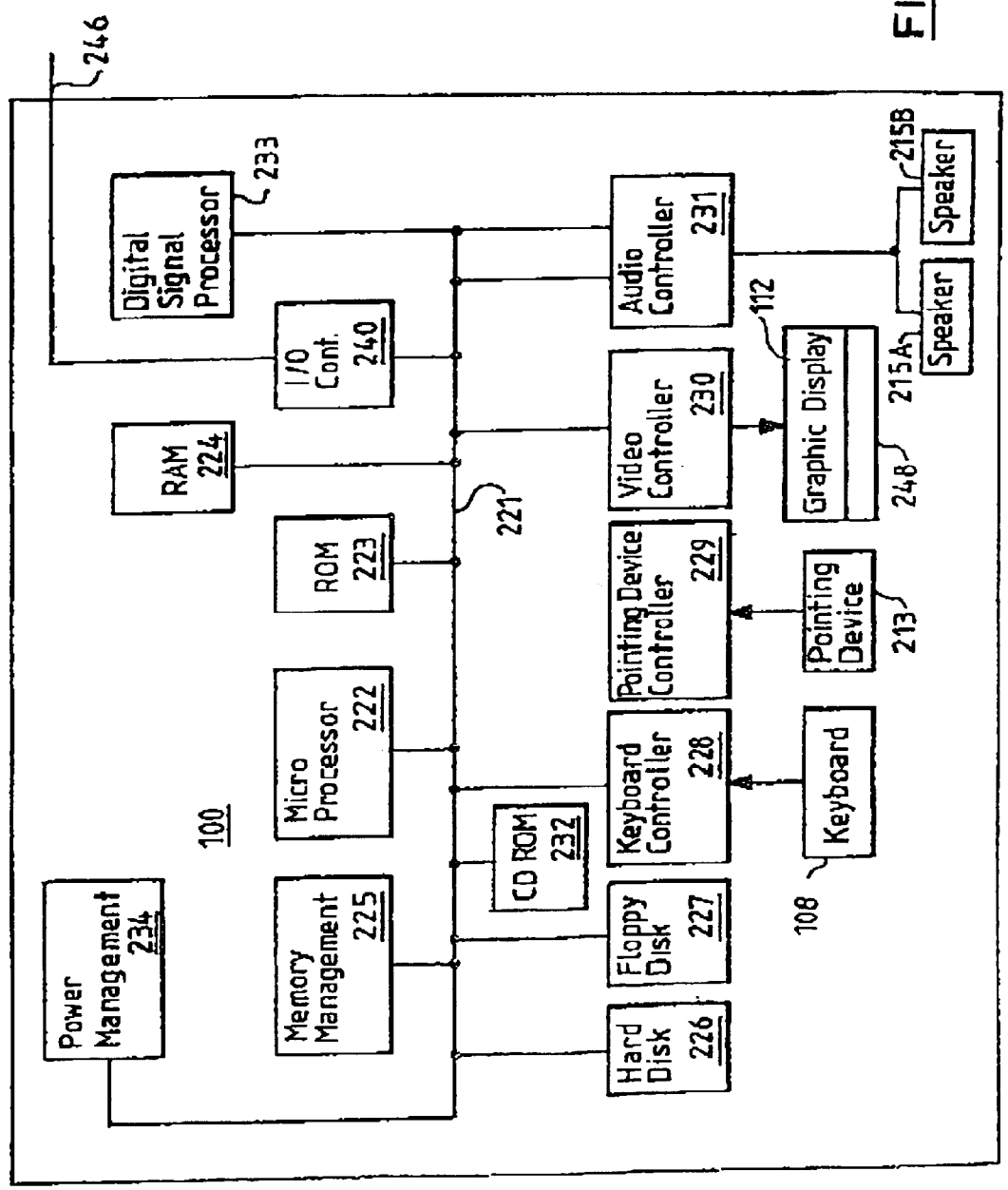
FIG. 2 is a block diagram of the portable computer of FIG. 1.

FIG. 2 shows a prior art portable computer 100, comprising a keyboard 108, a pointing device 213 and a display 112 having a backlight 248, depicted in block diagram form. The portable computer 100 includes a system bus or plurality of system buses 221 to which various components are coupled and by which communication between the various components is accomplished. The microprocessor 222 is connected to the system bus 221 and is supported by read only memory (ROM) 223 and random access memory (RAM) 224 also connected to system bus 221. In many typical computers the microprocessors including the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 223 contains among other code the Basic Input-Output System (BIOS) which controls basic hardware operations such as the interaction between the CPU and the disk drives and the keyboard. The RAM 224 is the main memory into which the operating system and application programs are loaded. The memory management chip 225 is connected to the system bus 221 and controls direct memory access operations including passing data between the RAM 224 and hard disk drive 226 and floppy disk drive 227. The CD ROM 232 also coupled to the system 221 is used to store a large amount of data, e.g. a multimedia program or presentation. CD ROM 232 may be an external CD ROM connected through an adapter card or it may be an internal CD ROM having direct connection to the motherboard.

Also connected to this system bus 221 are various I/O controllers: the keyboard controller 228, the pointing device controller 229, the video controller 230 and the audio controller 231. As might be expected, the keyboard controller 228 provides the hardware interface for the keyboard 108, the pointing device controller 229 provides the hardware interface for pointing device 213, the video controller 230 is the hardware interface for the display 112, and the audio controller 231 is the hardware interface for the speakers 215a and 215b. The power management controller 234 is connected to the system bus and receives power from a battery or from an external power supply which converts the ac voltage from a building supply to a predetermined lower dc voltage used to operate the portable computer 100. An I/O controller 240 such as a Token Ring adapter card enables communication over a network 246 to other similarly configured data processor systems. These I/O controllers may be located on the motherboard within the portable computer or they may be located on adapter cards or cartridges which plug into the motherboard. The adapter cards may communicate with the motherboard using a PCI interface, an ISA or EISA interface or other interfaces.

FIG. 3 shows a side cross-section of apparatus for lighting the keyboard according to the present invention. One or more fiber-optic cables 302 transmit light from a display backlight 248 through the hinge 106 from the cover 104 to the base 102. The fiber-optic cables 302 are typically manufactured of a plastic material, which is flexible and does not suffer from fatigue problems. The fiber-optic cable has a minimum bend radius and the connection through the hinge 106 from the cover 104 to the base 102 needs to ensure that this minimum bend radius is not breached. Provided this minimum bend radius is not breached, then there will be insignificant attenuation of the light by the bending of the fiber. The display backlight 248 typically provides around 5,000 Cd/m$^2$ of illumination to the display 112 and so the "leakage" of a small proportion of the light from the display backlight 248 to the fiber-optic cables 302 will not significantly affect the level of display illumination. The backlight 248 is typically provided with a reflector 304 to improve its efficiency.

FIG. 4 shows a cross-section view of a key 110 suitable for use in the present invention. The key includes a main portion 406 and a portion 402 containing the lettering, numeral, symbol or other marking on the keytop. The portion 402 and the main portion may be separate pieces attached during a manufacturing process or may be integral with each other. A transparent or translucent optical conducting portion 404 is provided to conduct light from the fiber 302 to the portion 402. Portion 402 may be translucent over the whole of its area or it may be translucent or transparent only in the area occupied by the letter, numeral, symbol or other marking. Other means of lighting individual keys may be used in the present invention.

As has been discussed above, the present invention is aimed at improving the usability of a portable computer in environments having low ambient light levels. In some of these environments the ambient light is insufficient to be able to see keys on the keyboard, but only a small amount of additional lighting is needed or alternatively a large amount of additional lighting may be needed as the eyes of the user are adjusted to the level of ambient lighting. In other environments the ambient light may be very low or near to darkness, so the keys may need to be fully lit in order to be seen or they may only need a small amount of additional lighting as the eyes of the user are adjusted to the darkness.

FIG. 5 shows a first embodiment of an adjustment mechanism to adjust the amount of light which reaches the keyboard. This mechanism operates by aligning, misaligning or partially aligning the fiber-optic cables so as to implement an intensity control. Portions 502 and 504 are made of material which is substantially optically transparent. Light enters the adjustment mechanism at face 510. Light leaves the adjustment mechanism at face 512. Portion 504 is arranged to slide along portion 502 in the direction shown by arrow 506. Typically, the movement of portion 504 may be achieved by means of a user control. A resilient means may apply pressure to either or both of surfaces 510, 512, so as to encourage portions 504 and 502 in a direction opposite to that of arrow 506. A user control force may then be applied in direction 506.

FIG. 6 shows a second embodiment of the invention in which two optical fibers 602, 604 are merely positioned so that in one position they are aligned and in other positions along the axis of arrow 606 they are partially or entirely misaligned.

It is well known that certain colors of light are more suitable if it is desired to retain "night vision", that is the ability to see dim points of light in the distance outside. Looking at brightly lit objects or at objects lit with white light can cause the eye to adjust for the brightly lit object and take some time to re-adjust so as to be able to see the less bright objects outside. Typically a red color is used, for example, on board ships. Similarly, it may be desired that a certain color of light is used for maximum legibility. In photographic darkrooms, it may be desirable to use a particular color of light in order to avoid exposure of undeveloped photographic films.

FIG. 7 shows a mechanism for controlling the color of light which is used to illuminate the keyboard. Light enters the mechanism 700 in the direction of arrow 708. The light strikes a prism 704 and is split into various colors leaving the prism at face 712. Coupler 706 receives all or a portion of the various colors of light and directs the received light to an optical fiber 710. The fiber 710 then supplies the light to the keyboard for the purpose of illuminating the keyboard. Prism 704 may be rotated by a user control so as to provide white light illumination when substantially all of the light split by the prism is collected by coupler 706 or it may provide light of various colors according to whether coupler 706 is adjusted so as to receive those particular colors of light. The prism is located in a cavity 702 which may optionally have a coating 712 for the reflection of light so as to improve the efficiency of the color selection mechanism. In order to select the color of light, relative rotation of portions 706 and 704 is required, so either or both portions may be rotatable.

The display backlight has strong primary colors in its light spectrum as it needs to be able to display white on the display and so a wide range of colors are available for illumination of the keyboard.

While the preferred embodiments have been described here in detail, it will be clear to those skilled in the art that many variants are possible without departing from the spirit and scope of the present invention. In particular, the preferred embodiments have been described in terms of illuminating a keyboard, whereas the present invention may also be advantageously applied to illuminating other portions of the computer, such as for example, a pointing device, or even a manufacturer's logotype.

What is claimed is:

1. Apparatus for illumination of a keyboard in a computing device having a display contained in a portion of the computing device which is hingeably attached to a keyboard portion, the display having a backlight, the system comprising:

one or more translucent elements associated with the keyboard;

one or more light-conducting fibers for conducting light from the backlight of the display to the one or more translucent elements associated with the keyboard; and a color adjustment mechanism having a prism for receiving light from the one or more light-conducting fibers and for splitting the received light according to the wavelength of the received light and a coupler for collecting all or a portion of the light split by the prism and for transmitting the collected light to one or more second light-conducting fibers wherein the prism is adapted to rotate in a cavity, and wherein the internal surface of the cavity has at least a portion coated with a light reflecting material.

* * * * *